United States Patent [19]

Bateman et al.

[11] Patent Number: 5,787,079

[45] Date of Patent: Jul. 28, 1998

[54] METHOD AND APPARATUS FOR CREATING MULTIPLE SUBCHANNELS IN A SINGLE TWO-WAY RADIO CHANNEL

[75] Inventors: Andrew Bateman, Bathe; Peter B. Kenington, Winterbourne; Richard M. Bennett, Henbury, all of United Kingdom

[73] Assignee: Unique Wireless Developments, L.L.C., Irving, Tex.

[21] Appl. No.: 636,549

[22] Filed: Apr. 23, 1996

[51] Int. Cl.$^6$ ........................................... H04J 1/02
[52] U.S. Cl. ........................... 370/343; 370/491; 370/493
[58] Field of Search ........................... 370/281, 295, 370/343, 344, 480, 491, 492, 493, 494, 495, 496, 318

[56] References Cited

U.S. PATENT DOCUMENTS

| | | | |
|---|---|---|---|
| 4,117,405 | 9/1978 | Martinez | 325/58 |
| 4,313,211 | 1/1982 | Leland | 455/139 |
| 4,466,130 | 8/1984 | Sewerinson | 455/260 |
| 4,479,256 | 10/1984 | Sewerinson | 455/265 |
| 4,539,707 | 9/1985 | Jacobs et al. | 455/47 |
| 4,644,526 | 2/1987 | Wu | 370/30 |
| 4,829,588 | 5/1989 | Keyser | 455/21 |
| 5,109,531 | 4/1992 | Heck | 455/47 |
| 5,129,098 | 7/1992 | McGirr et al. | 455/69 |
| 5,410,739 | 4/1995 | Hart | 455/66 |

OTHER PUBLICATIONS

"Feedfoward Transparent Tone-In-Band: Its Implementations and Applications" by Andrew Bateman; IEEE Transactions on Vehicular Technology, vol. 39, No. 3, Aug. 1990.
"Speech and Data Communications Over 942 MHz TAB and TTIB Single Side band Mobile Radio Systems Incorporating Feed-Forward Signal Regeneration" by Andrew J. Bateman, Gary Lightfoot, Anthony Lymer and Joseph P. McGeehand, IEEE Transhactions on Vehicular Technology, vol. VT-34, No. 1, Feb. 1985.

*Primary Examiner*—Douglas W. Olms
*Assistant Examiner*—Matthew C. Phillips
*Attorney, Agent, or Firm*—Locke Purnell Rain Harrell

[57] ABSTRACT

A system for creating multiple subchannels in a single two-way radio channel and a power control system for a mobile radio transmitter are described. Each subchannel in the system is capable of carrying voice or data. Each subchannel is split into an upper and a lower band with the upper band placed in a particular frequency range above the center of the channel and the lower band is placed in a corresponding frequency range below the center of the channel. Either one or two pilot tones placed at or adjacent to the center of the channel are used to provide a reference for all of the subchannels to allow for correction of distortions when the signal is received. The system includes base station with a transmitter and receiver and a plurality of mobile units each with a transmitter and a receiver. The base station transmits a signal which is the sum of all the subchannels. The mobile unit receives the signal, separates and processes the particular subchannel for that mobile unit. The mobile unit transmits only the desired subchannel or subchannels with a pilot tone located adjacent to one of the bands of the subchannel. Two or more subchannels can be used in conjunction to achieve faster data rates or higher quality voice transmissions. The mobile transmitter power control system for the mobile transmitter allows the mobile unit to monitor the pilot tone from the base station and to calculate a transmission power based on a desired signal strength. Additionally, the transmission power may be altered during transmission as commanded by the base station, or if the mobile unit measures a change in the strength of the pilot tone from the base station.

29 Claims, 10 Drawing Sheets

Up-Link Signal at Transmitter

Composite Up-Link Signal at Receiver

FIG. 5  Base Station Transmitter Block Diagram

Sub-Band Relocation

METHOD AND APPARATUS FOR CREATING MULTIPLE SUBCHANNELS IN A SINGLE TWO-WAY RADIO CHANNEL

FIELD OF THE INVENTION

The present invention relates to a method and apparatus for creating multiple subchannels in a single two-way radio designated channel. Each subchannel is capable of handling both data and voice communications.

BACKGROUND OF THE INVENTION

The radio spectrum is a limited resource that is quickly becoming filled to capacity. The Federal Communications Commission of the United States, as well as corresponding governmental bodies in other countries, regulate the radio spectrum and determine who is able to broadcast at particular frequencies in specific areas. The regulations are meant to prevent users from having to compete to send signals, and to promote orderly and efficient use of the airwaves.

For example in certain two way radio bands, the FCC has adopted a 25 kHz spacing between adjacent channels of a bandwidth less than 25 kHz. The majority of the channels only support a single voice or data signal at a time. In many areas the entire spectrum of these channels is occupied and there is a great need for more channels to allow other users to access these resources. Many systems currently use digital transmission that use time sharing arrangements, where multiple signals are transmitted in small portions sequentially over the channel. The sequential nature of the transmission is meant to be transparent to the users. These systems are complex and can have limited range due to their digital nature.

Other systems that attempt to place multiple subchannels in a narrow band radio channel simply stack multiple versions of complete narrow band signals side by side within the channel. This results in very poor spectral effiency, since each of the subchannels requires buffers between adjacent subchannels and its own pilot tone. This method also does not allow flexibility in data transmission or voice quality which can be achieved by combining multiple subchannels to carry a single signal.

SUMMARY OF THE INVENTION

It is therefore an object of the invention to provide a system to allow multiple subchannels to be transmitted over a single two-way radio channel.

It is another object of the invention to provide a two-way radio system that includes multiple subchannels where the multiple subchannels are split into upper and lower bands, the upper and lower bands being arranged sequentially outward from the center of the radio channel for each particular subchannel.

It is another object of the invention to provide a mobile power control system that monitors the base station signal strength and establishes an initial mobile transmission power level. The control system then continuously adjusts transmission power to compensate for changes in the signal strength.

A method for creating multiple subchannels in a single two-way radio channel is described. Subchannels carrying either voice or data are split into upper and lower bands. These bands are placed above and below, respectively, the center of the channel in a frequency range determined by the particular subchannel. The center of the channel is occupied by one or two pilot tones that are used for all subchannels.

Additionally, a multi-channel two-way radio system is provided that divides a single two-way radio channel into at least two subchannels. Each of the subchannels is divided into an upper and lower band where the upper bands are placed in the radio channel at frequencies above the center of the channel. Similarly, the lower bands are placed in the channel at frequencies below the band center.

The system is provided with a base station, or multiple linked base stations, each having a transmitter and receiver. The base station communicates with a plurality of mobile transmitters and receivers. Each of the mobile units is able to communicate with the base station using one of the subchannels without interference from other subchannels. The base station combines the signals for all subchannels and can transmit the combined signal to other mobile units which decode the appropriate subchannel. The system also can, effectively, combine multiple subchannels into a single channel to provide faster data rates or improve audio bandwidth and quality.

The mobile units have a different tranmission configuration from the base station. The mobile units transmit a single subchannel, or multiple subchannels for improved data rates or voice quality, and locate a pilot tone for the subchannel adjacent to one of the sub-bands. The pilot tone causes a small reduction in bandwidth for the band it is next to. The base station receiver receives all the subchannels and decodes each, using the pilot for each subchannel to compensate for distortion in the signal due to Doppler effects and similar problems.

A mobile power control system is also provided that allows the mobile transmitter to determine its transmission power with reference to a pilot tone generated by the base station transmitter. The mobile transmitter calculates the transmission power for the desired signal strength based on the measured pilot tone strength. During transmission, an estimated signal strength is determined based on the transmission power. The transmission power can be altered during transmission either in response to a command from the base station or in response to a measured change in the strength of the pilot tone. If the base station orders a change in the transmission power, the transmission power is altered and the estimate of the signal strength is adjusted accordingly. If a change in the pilot tone signal strength is detected, the transmission power is also adjusted accordingly.

BRIEF DESCRIPTION OF THE DRAWINGS

Other objects and features of the invention will become more readily apparent from the following detailed description when read in conjunction with the accompanying drawings, wherein.

DETAILED DESCRIPTION

Figure 1:
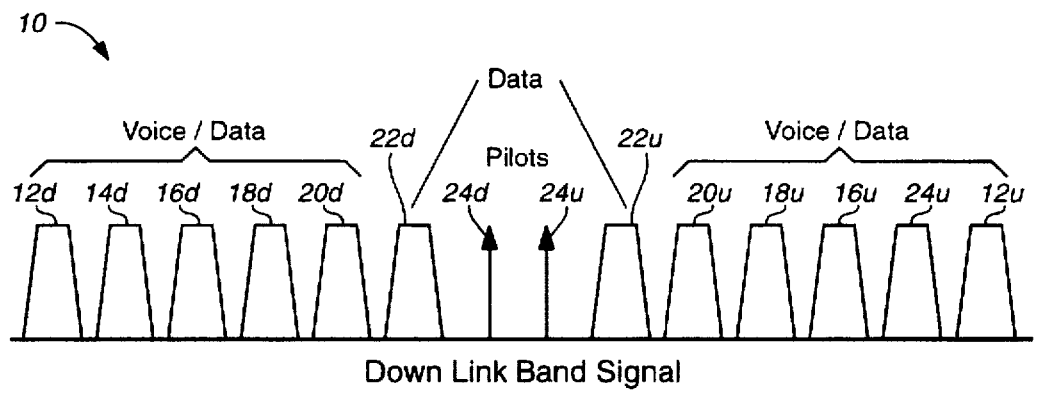
FIG. 1 is a frequency diagram showing the signal formed by the base station transmitter of the present invention for a single two-way radio channel.

Referring now to FIG. 1, a frequency diagram of the down link band signal from the base station for a single radio channel employing the present invention is shown. Channel 10 can be any single radio channel including a two way radio channel as prescribed by the Federal Communications Commission ("FCC"). As shown in FIG. 1, channel 10 is split into subchannels which are then split into two equal subbands, upper bands 12u, 14u, 16u, 18u, 20u and 22u, and lower bands 12d, 14d, 16d, 18d, 20d, and 22d. Upper and lower pilot tones 24u and 24d, respectively, are placed on either side of the center of channel 10 and separate the upper bands from the lower bands.

Placing upper and lower pilot tones 24u and 24d at the center of channel 10 prevents the pilot tones from being interfered with by adjacent channels as can happen when the pilot tones are placed at one edge of the channel. Either upper or lower pilot tones, 24u or 24d, on either side of the center of channel 10, are used as gain and phase references to allow for correction of multi-path fading, receiver local oscillator error, and Doppler shifts due to the movement of the mobile unit.

Channel 10 can be divided into any multiple of subchannels. In the preferred embodiment of the present invention, however, channel 10 is divided into five voice/data subchannels 12u and 12d, 14u and 14d, 16u and 16d, 18u and 18d, and 20u and 20d, and a single data-only subchannel 22u and 22d. In the preferred embodiment each of voice/data subchannels 12u and 12d, 14u and 14d, 16u and 16d, 18u and 18d, and 20u and 20d from the system base station transmitter are encoded with the voice or data signal using linear modulation ("LM") and have a bandwidth of 3100 Hz, or 1550 Hz for each sub-band. This bandwidth results in a data capability of 9.6 kilo bits per second ("kbps"). Data-only subchannel 22u and 22d from the system base transmitter has a bandwidth of 1800 Hz, or 900 Hz for each sub-band, resulting in a data transmission rate of 2.4 kbps. Data-only subchannel 22u and 22d is positioned deliberately adjacent to the center of channel 10, again to protect against adjacent channel interference, but also to minimize the sampling rate when decoding data-only subchannel 22u and 22d which is likely to be carrying trunking data.

Figure 2:
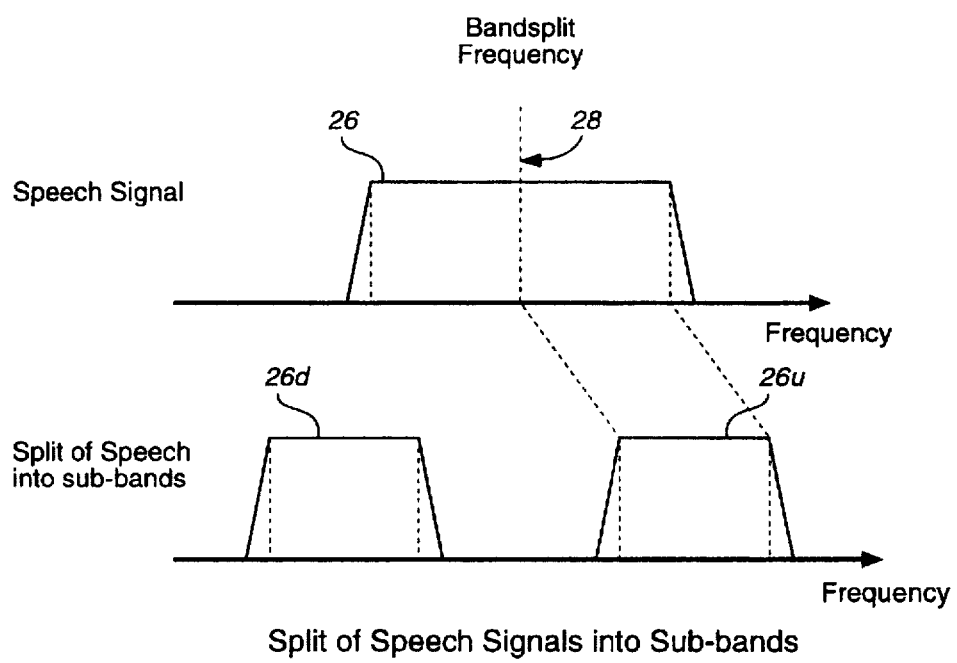
FIG. 2 is a frequency diagram showing the splitting of a single band signal into a split band signal having upper and lower halves.

FIG. 2 shows how each LM modulated subchannel in channel 10 is mapped into upper and lower sub-bands. Signal 26 is split about bandsplit frequency 28. Each half of signal 26 is then mapped with the appropriate offset to create upper sub-band 26u and lower sub-band 26d.

Figure 3:
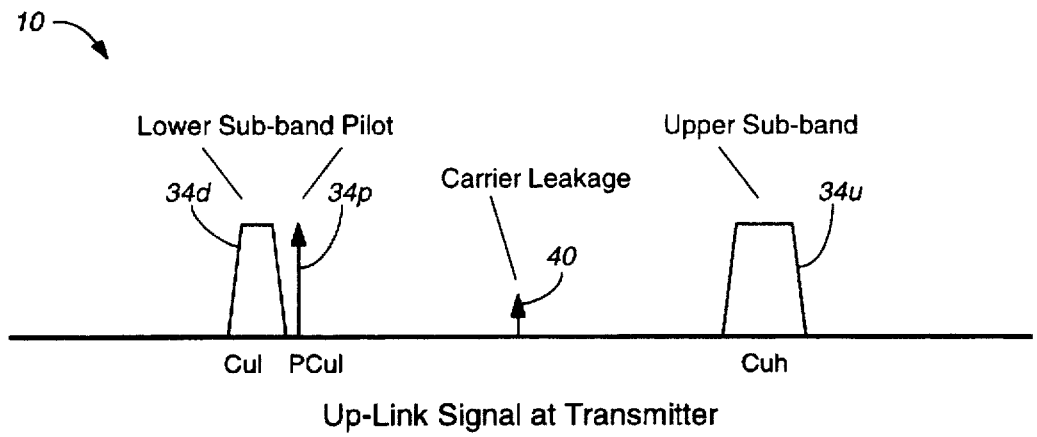
FIG. 3 is a frequency diagram showing the signal formed by a mobile transmitter of the present invention.
Figure 4:
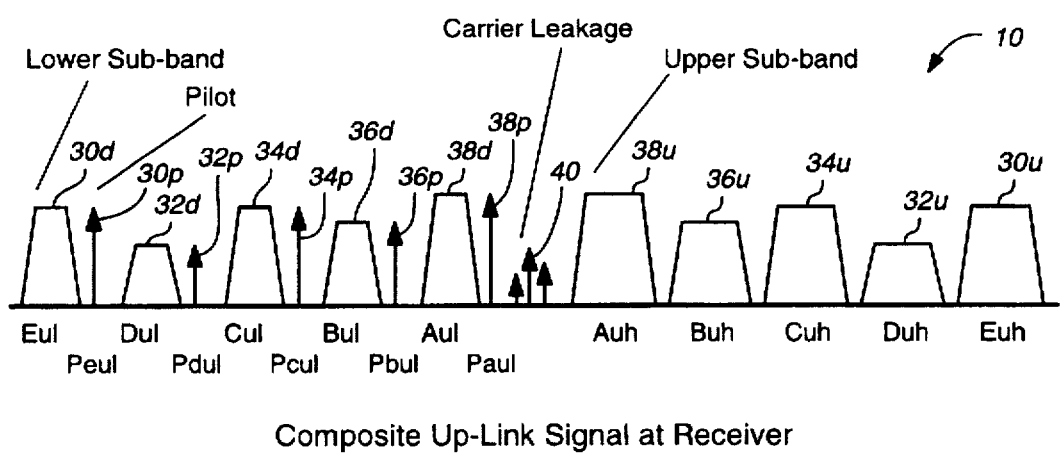
FIG. 4 is a frequency diagram showing the signal received at the base station from a plurality of mobile transmitters.

FIGS. 3 and 4 show the up link signal created by mobile units. Subchannel 34 is divided at the mobile unit into upper sub-band 34u and lower sub-band 34d. Since the mobile unit is only transmitting one subchannel at a time, the mobile unit transmits mobile pilot tone 34p which is adjacent to lower sub-band 32d. Mobile pilot tone 34p is used for the same reasons as pilot tones 24u and 24d, but additionally, identifies which subchannel a particular mobile is transmitting on. Since subchannel 34 appears in upper band 34u and lower band 34d separated from the center of channel 10, carrier leakage 40 produced by the mobile transmitter does not affect any of the subchannels.

A composite of the up link signal at the receiver when all subchannels are being used is shown in FIG. 4. Each subchannel is shown with its associated upper band 30u, 32u, 34u, 36u, and 38u, lower band 30d, 32d, 34d, 36d, and 38d, and mobile pilot tone 30p, 32p, 34p, 36p, and 38p. Carrier leakage 40 from the mobile transmitters again appears at the center of channel 10 and does not interfere with any of the subchannels due to the gap left for this purpose. In the preferred embodiment, each mobile up link subchannel has a bandwidth of 2700 Hz, with the upper band consuming 1564 Hz and the lower band 1136 Hz. The other 300 Hz of bandwidth is used for the mobile pilot tone associated with the subchannel. Subchannels, in FIG. 4, are shown varying in amplitude to indicate signal strengths due to relative distances of mobile units from the base station.

Figure 5:
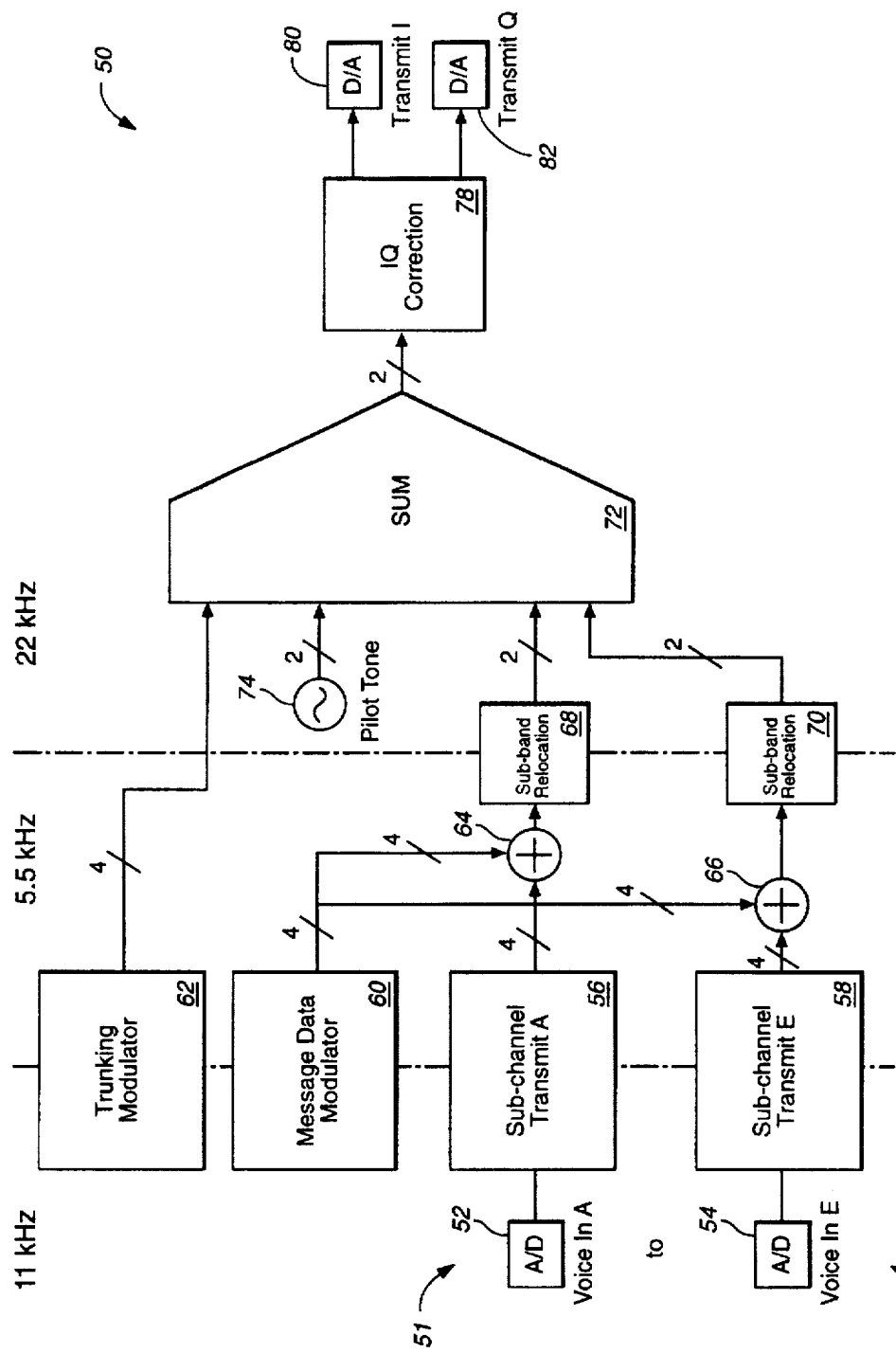
FIG. 5 is a block diagram of the base station transmitter.
Figure 6:
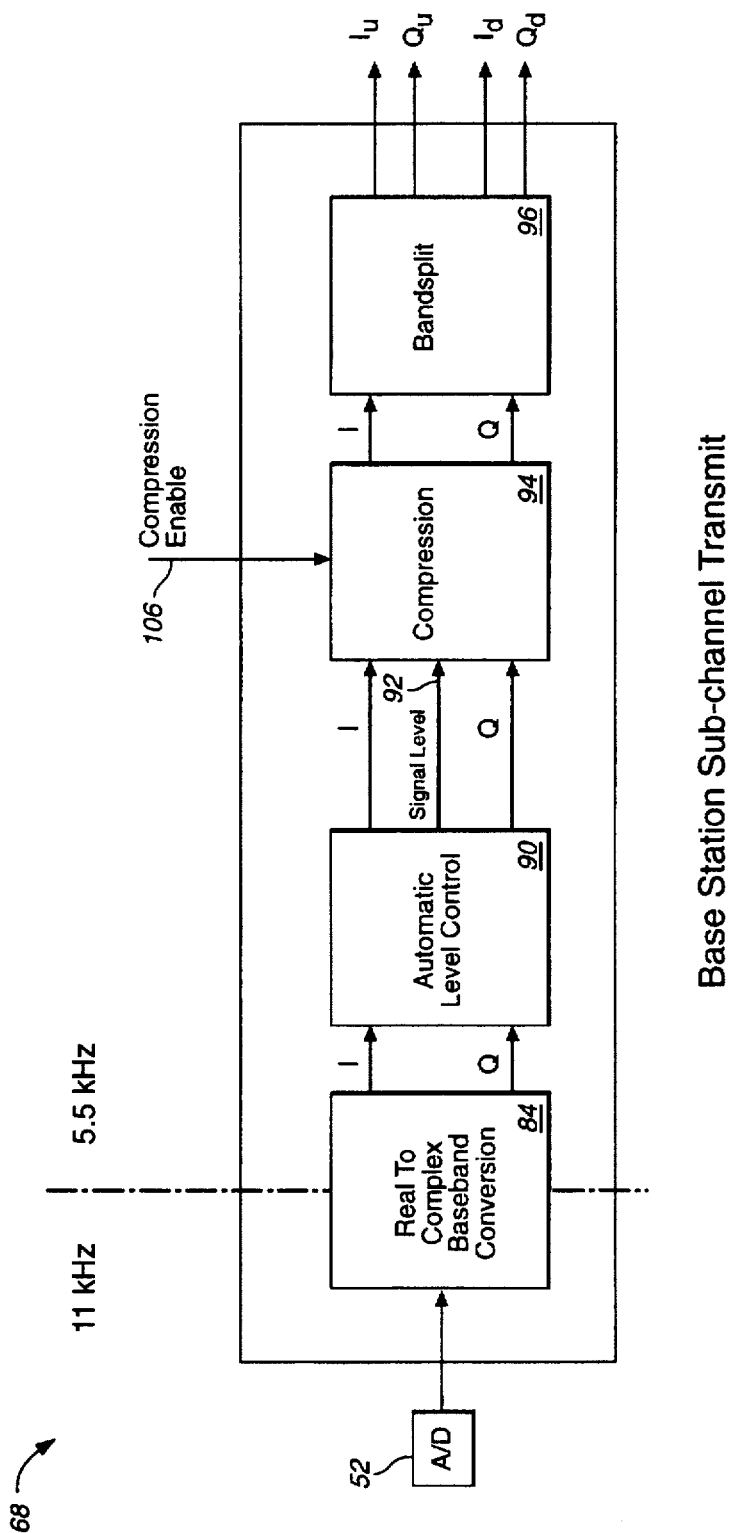
FIG. 6 is a block diagram of the subchannel transmitter element of the base station transmitter from FIG. 5.
Figure 7:
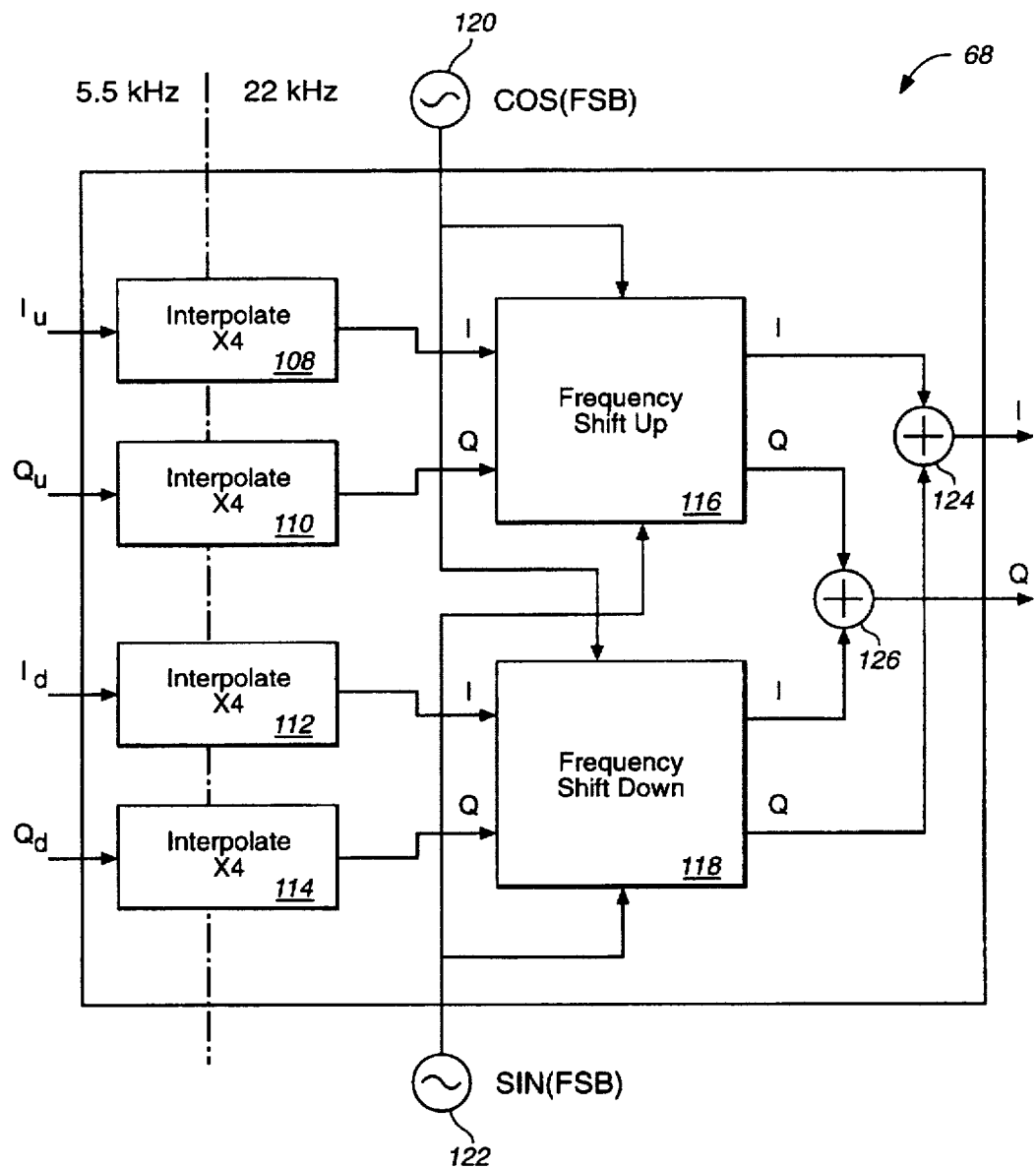
FIG. 7 is a block diagram of the sub-band relocation element of the base station transmitter from FIG. 5.

Referring now to FIGS. 5 to 7, the base station transmitter of the present invention is described. FIG. 5 is a block diagram of one embodiment of base station transmitter 50. Base station transmitter 50 has inputs from voice subchannels 51 and 53 through analog-to-digital ("A/D") converters 52 and 54. The outputs from A/D converters 52 and 54 are then inputted to subchannel transmitters 56 and 58, respectively. Subchannel transmitters 56 and 58 are used to split the real signal into its complex components comprised of the inphase component ("I") and the quadrature component ("Q"). Subchannel transmitters 56 and 58 also are used to compress the data contained in the signals if necessary and to split the signal into an upper and lower band as shown in FIG. 2. Subchannel transmitters 56 and 58 are shown in detail in FIG. 6, and described further below.

Message data modulator 60 is used to add digital data to the voice subchannels through summing nodes 64 and 66. The outputs of summing nodes 64 and 66 are then inputted to sub-band relocators 68 and 70 which place the upper and lower bands of each signal created in subchannel transmitters 56 and 58 into the proper areas of the radio channel from the corresponding to the respective subchannel. Each of the subchannels, as outputted from sub-band relocators 68 and 70, is then inputted into summer 72 where they are combined with the pilot tone generated by pilot tone generator 74 and trunking data from trunking modulator 62. The combined signal from summer 72 is then sent to IQ corrector 78 where any non-linear performance and signal distortion is corrected. Both the I and the Q components are then outputted from IQ corrector 78 to I digital-to-analog (D/A) converter 80 and Q D/A converter 82, respectively, where the signals are then transmitted to the mobile units by base station transmitter (not shown).

Although base station of transmitter 50 of FIG. 5 is shown with two voice subchannels 51 and 53, any number of voice subchannels can be accommodated by adding a new subchannel transmitter, summing node and sub-band relocator for each new voice path. As discussed above, the preferred embodiment utilizes a base station transmitter with five voice subchannels. The choice of five voice subchannels in the preferred embodiment was determined by the desire to have a bandwidth of 3100 Hz for each voice subchannel. Five such subchannels fit in a radio channel having approximately a 20 kHz bandwidth. The number of voice subchannels, therefore, will be determined by desired subchannel bandwidth and available bandwidth.

FIG. 6 is a block diagram of a subchannel transmitter as shown by subchannel transmitter 56 in FIG. 5. A voice subchannel enters subchannel transmitter 56 through A/D converter 52 where it is inputted into real-to-complex baseband converter 84. Real-to-complex baseband converter 84 is used to split the output of A/D converter 52 into complex components I and Q. These complex components are then inputted into automatic level controller 90 which monitors the levels of the inputted signals and adjusts the level of I or Q as necessary. Additionally, signal level 92 is outputted from automatic level controller 90 and is used in the level compression of the signal.

Both I and Q are sent from automatic level controller 90 to feed forward compression block 94 along with signal level 92. Feed forward compression 94 maps signal level 92 to a table of preset values which provides an arbitrary amount of compression. The amount of signal compression can be altered by altering the preset values accessed by signal value 92. Also, compression enable 106 is used to allow feed forward compression 94 to be enabled or disabled as necessary for the particular type of information transmitted. I and Q are sent from feed forward compression 94 to bandsplitter 96. Bandsplitter 96 is used to split I and Q into upper and lower sub-bands for mapping into the radio channel. Splitting I and Q in bandsplitter 96 creates an upper band signal $I_u$ and $Q_u$, and lower band signal $I_d$ $Q_d$, also used in FIG. 7.

FIG. 7 is a block diagram of sub-band relocator 68 from FIG. 5. Upper band signal $I_u$, $Q_u$, and lower band signal $I_d$, $Q_d$ from subchannel transmitter through summing node 64 is inputted into sub-band relocator 68. Each signal $I_u$, $Q_u$, $I_d$ and $Q_d$ is sent through interpolators 108, 110, 112 and 114, respectively to bring the sampling rate up to a level compatible with the radio channels bandwidth. $I_u$ and $Q_u$ are then sent to frequency shift up 116, and $I_d$ and $Q_d$ are sent to frequency shift down 118 to place them in the specific areas of the radio channel associated with the particular subchannel. Summing nodes 124 and 126 are used to combine $I_u$, $Q_u$, $I_d$ and $Q_d$ signals into the I and Q signal. Oscillator inputs 120 and 122 are used by frequency shift up 116 and frequency shift down 118, respectively to provide reference frequencies used in the shifting operation.

Figure 8:
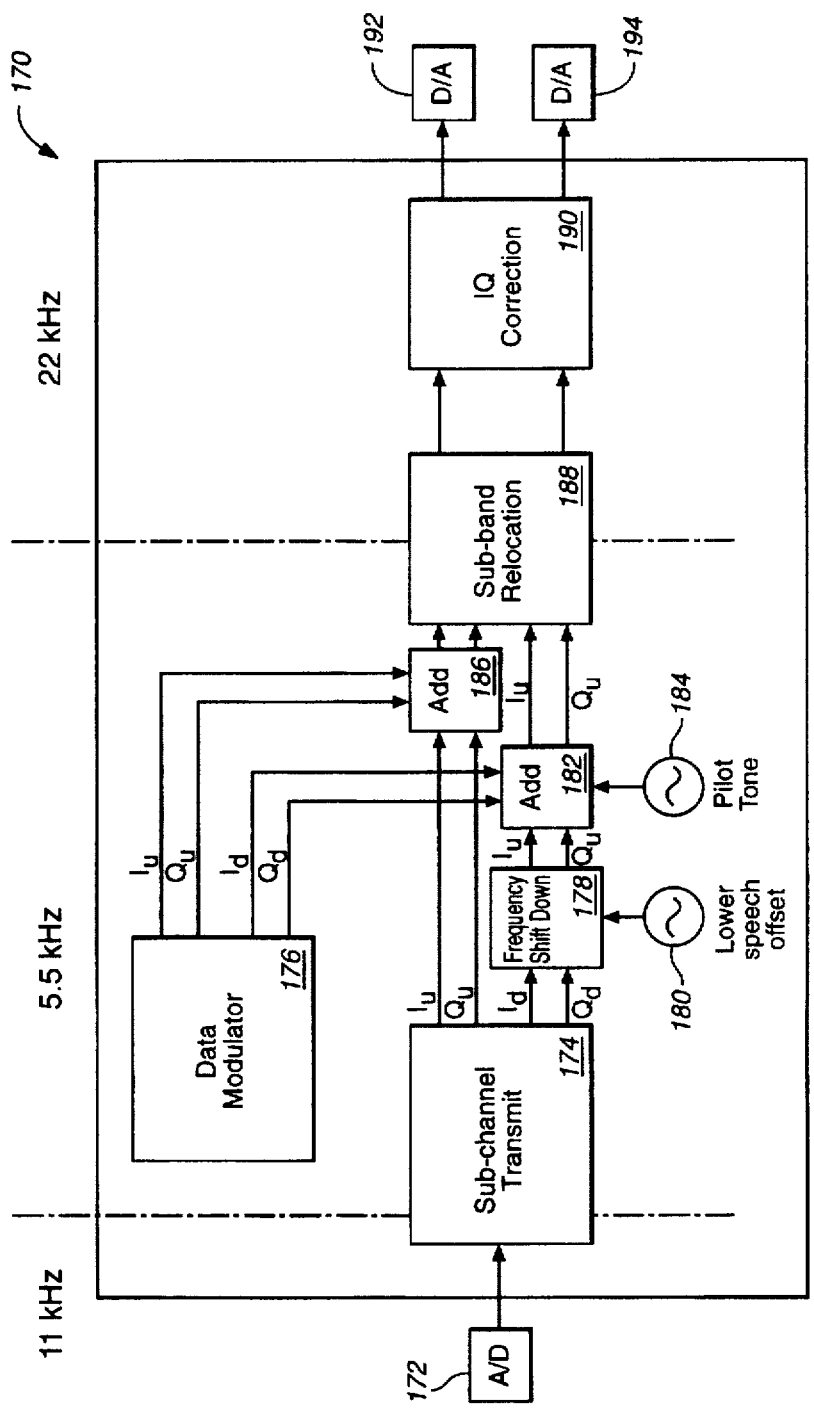
FIG. 8 is a block diagram of the mobile transmitter.

FIG. 8 is a block diagram of the mobile transmitter of the present system. Mobile transmitter 170 operates in the same manner as the base transmitter of FIGS. 5 to 7 except that only one or more subchannels is transmitted as shown in FIG. 3. Multiple subchannels can be used and combined to allow a faster data rate or greater audio bandwidth. A/D converter 172 is used to provide the digital signal to subchannel transmitter 174 where the signal is converted into a complex signal, compressed and bandsplit using the same elements and process described with reference in FIG. 6. To make room for the pilot tone associated with the mobile subchannel, the lower band consisting of $I_d$ and $Q_d$ is shifted by frequency shift down 178 which uses oscillator 180 to provide a reference frequency. Summing nodes 182 and 186 are used to add information from data modulator 176 to the voice signal $I_u$, $Q_u$ and $I_d$, $Q_d$, respectively. Summing node 182 is also used to add the pilot tone from pilot tone generator 184 to $I_d$ and $Q_d$. The complex signal is then processed by sub-band relocator 188 and IQ correction 190, just as described for the base transmitter before being converted back to an analog signal by D/A converters 192 and 194 for upconversion and amlification by the mobile transmitter (not shown).

Figure 9:
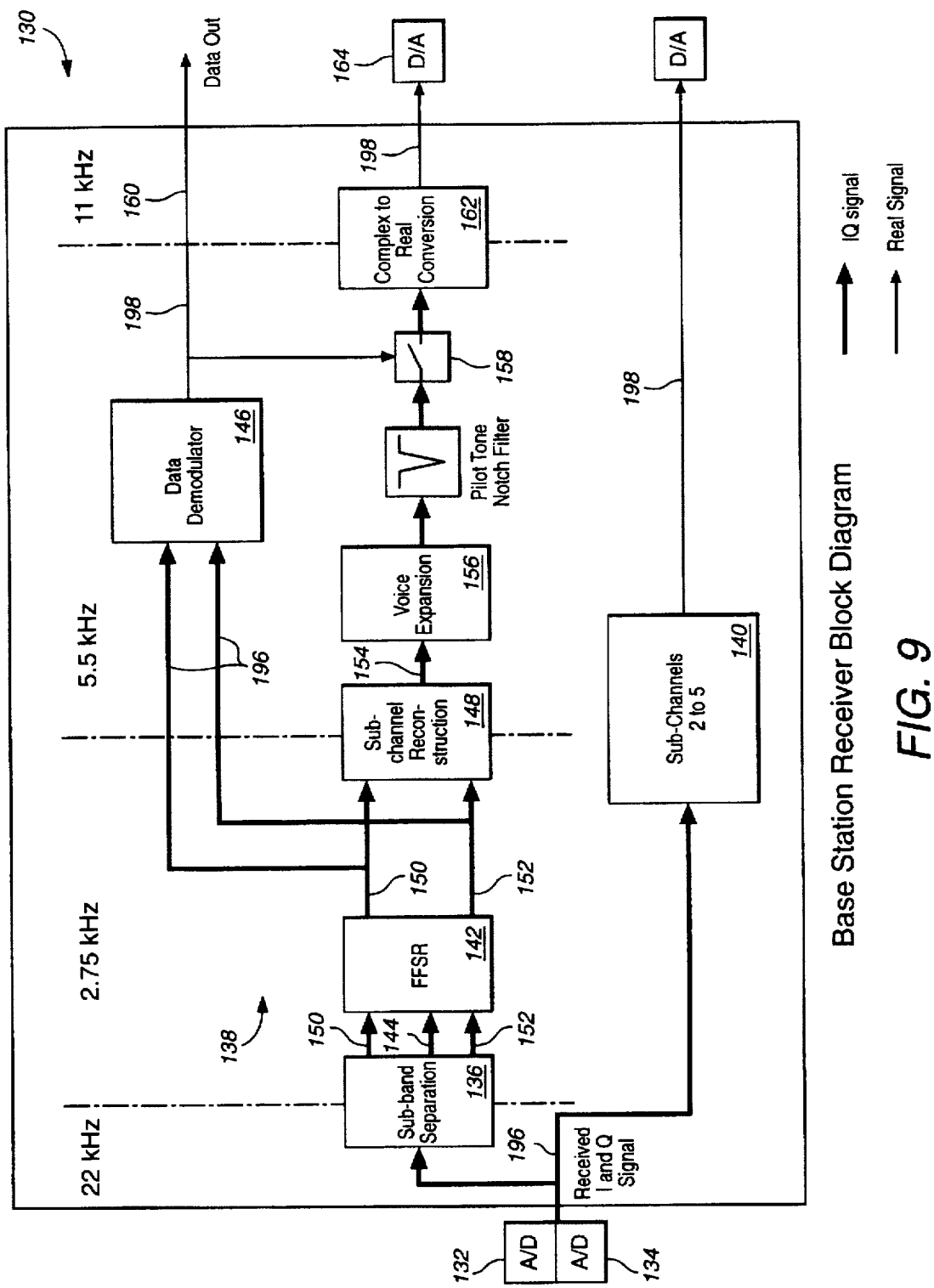
FIG. 9 is a block diagram of the base station receiver.

Referring now to FIG. 9, the preferred embodiment of the base station receiver is described. FIG. 9 shows a block diagram of base station receiver 130 which receives the transmitted analog I and Q signals from the mobile transmitter. The I and Q signals are converted into digital signals by A/D converters to be processed as shown by complex signal 196 shown in heavy trace, distinguished from real signal 198 in FIG. 9 which uses a thin trace. Complex signal 196 is formed by both I and Q. Although only subchannel decode path 138 is shown, many other subchannels, as necessary, can be decoded as represented by block 140 which represents duplicate decode paths identical to subchannel decode path 138 for each specific subchannel. Sub-band separator 136 operates to separate the particular subchannel to be decoded by subchannel decode path 138 from the received signal. Sub-band separator 136 also acts to move the upper and lower bands of the particular subchannel such that they are adjacent to each other and to separate pilot tone 144 which is used to regenerate the correct frequency and phase relationship in the upper and lower bands of the signal.

Upper and lower bands 150 and 152, respectively, of the signal as well as separated pilot tone 144 are sent to feed forward signal regenerator 142 which regenerates the pilot tone. The regenerated pilot tone of feed forward signal regenerator 142 is used to provide any compensation necessary to make up for distortion in the upper or lower bands due to effects such as Doppler shifts in the signal. Regenerated upper and lower bands 150 and 152, respectively, of the signal are then sent to data demodulator 146 and subchannel reconstruction 148. If the signal received is a data signal, data demodulator decodes the data from whatever modulation technique is used to code the data, such as Quadrature Amplitude Modulation, into a usable data signal.

If, on the other hand, the signal is a voice signal, sub-band reconstruction 148 is used to recombine the upper and lower halves of the signal to create complete signal 154. Single signal 154 is passed to voice expansion 156 which is used to reverse any compression performed by subchannel transmitter 174 of the mobile transmitter shown in FIG. 8. The decompressed signal is sent through switch 158 to complex-to-real converter 162. Switch 158 is used to disconnect the voice signal path if the signal is determined to be a data signal by data demodulator 146 resulting in digital data at the data out port 160. Complex-to-real converter 162 is used to convert the complex I and Q signal to a real voice or tone signal which is converted from digital to analog by D/A converter 164 and sent to the speaker or other audio device (not shown).

Figure 10:
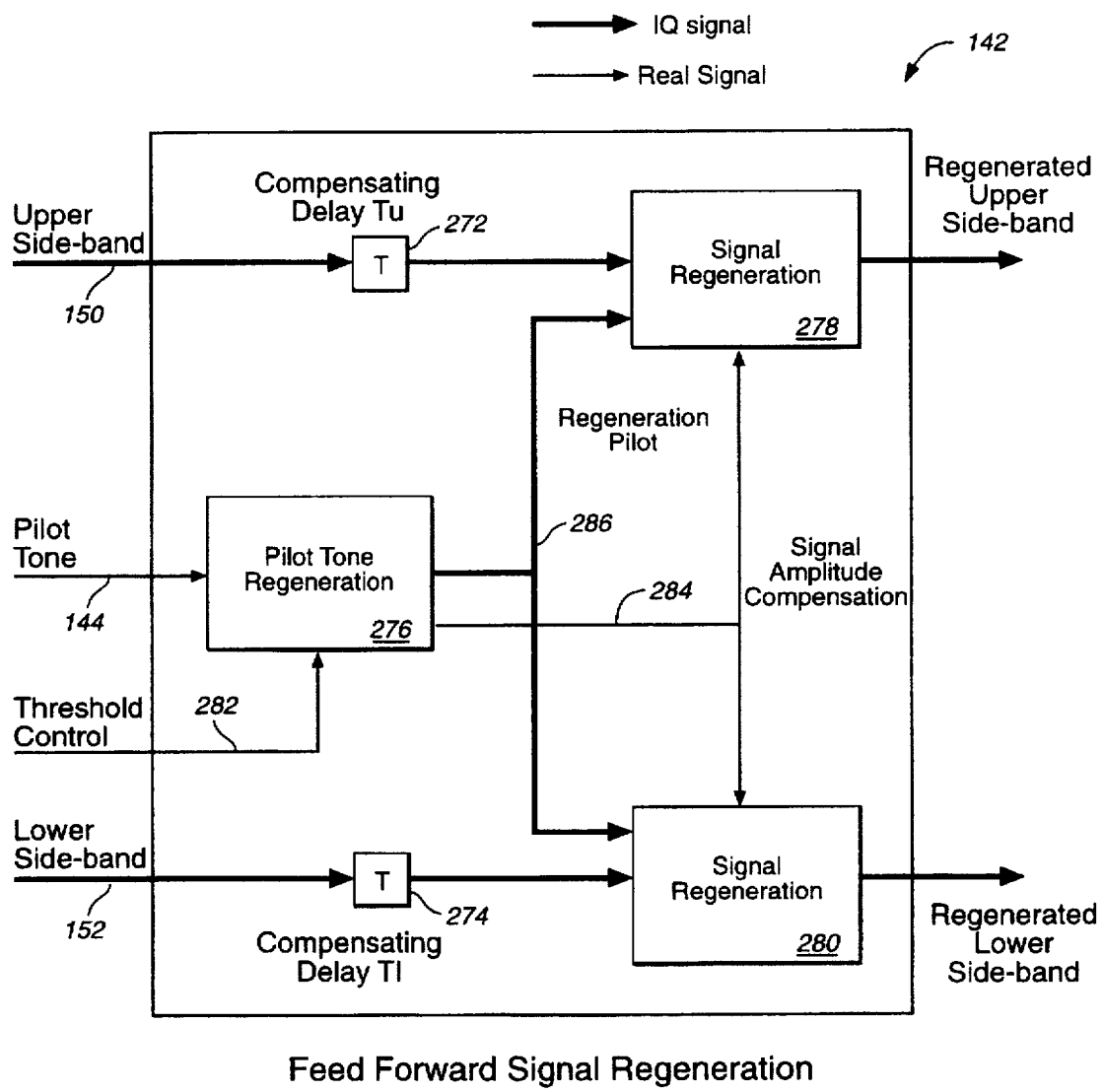
FIG. 10 is a block diagram of the feed forward signal regeneration element of the base station receiver from FIG. 9.

FIG. 10 is a block diagram of feed forward block signal regenerator shown in FIG. 9 by reference numeral 142. Upper band 150, lower band 152 and pilot tone 144 shown in FIG. 9 are inputted to feed forward signal regenerator 142. Pilot tone 144 is fed to pilot tone regeneration 276 with a threshold control which prevents attempts to regenerate when signal strengths are too low. Pilot tone generation 276 analyzes received pilot tone 144 and generates signal amplitude compensation 284 as well as regenerated pilot 286. Upper band 150 and lower band 152 are passed through compensating time delays 272 and 274, respectively, before being inputted to upper signal regeneration 278 and lower signal regeneration 280. Upper signal regeneration 278 and lower signal regeneration 280 use regenerated pilot tone 286 and signal amplitude compensation 284 to compensate for distortion in the received signal due to Doppler and other effects.

Figure 11:
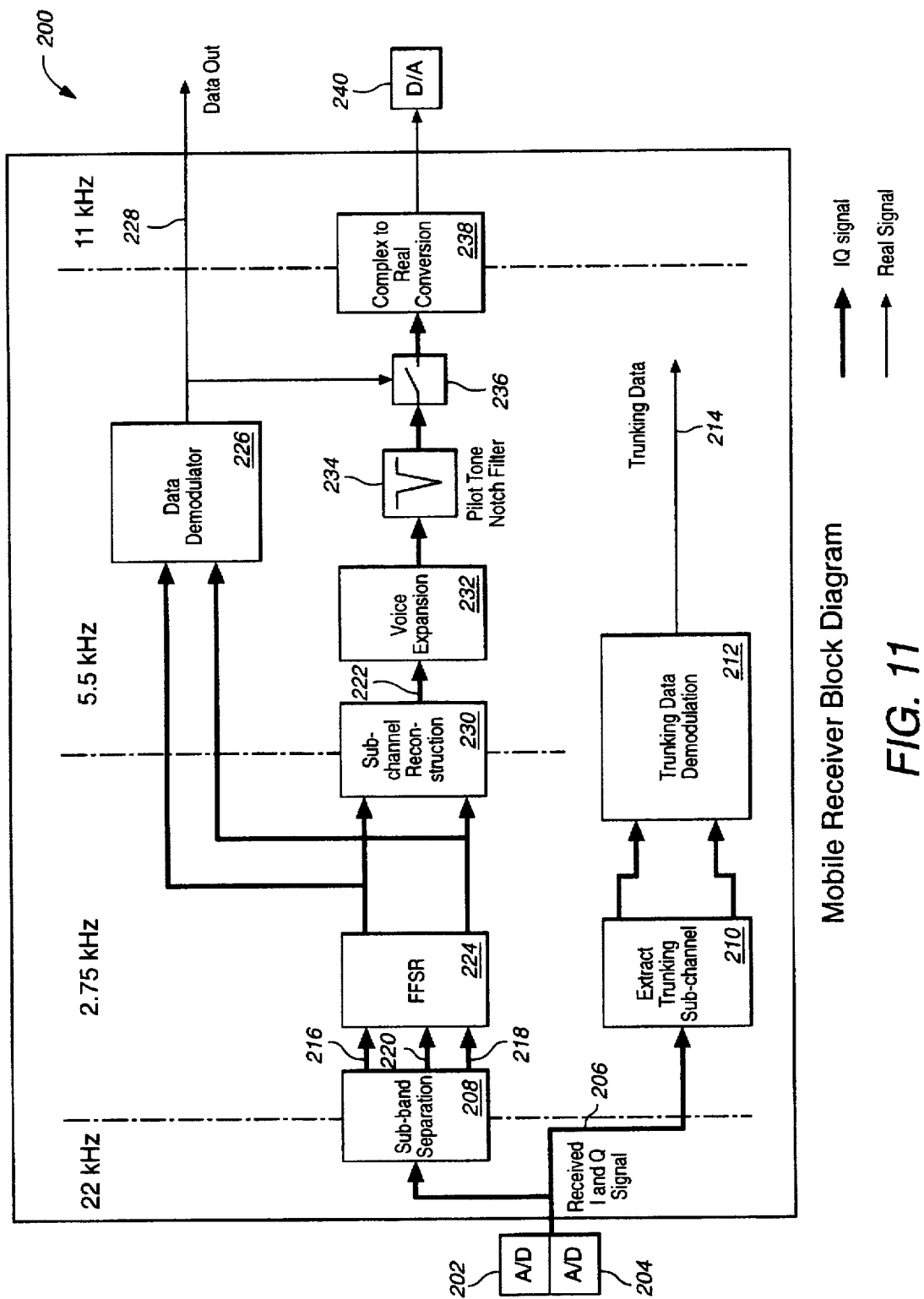
FIG. 11 is a block diagram of the mobile receiver.

FIG. 11 shows a block diagram of the mobile receiver for the present system. Mobile receiver 200 operates much as the base receiver described with reference to FIG. 9. Complex signal components I and Q are received at mobile receiver 200 and converted from analog to digital by A/D converters 202 and 204, respectively. Complex signal 204, shown as a heavy trace in FIG. 11, is sent to both sub-band separator 208 and trunking extraction 210. Trunking data extracted from trunking extraction 210 is sent to trunking data demodulator 212 where it is converted from the complex signal to a real trunking data signal 214 for processing. Sub-band separator 208 acts as described in FIG. 9 to separate and relocate the upper and lower bands from the pilot tone, and to send upper band 216 and lower band 218, as well as pilot tone 220 to feed forward signal regeneration 224. Feed forward signal regeneration 224, as described with reference to feed forward signal regenerator 142 shown in FIGS. 9 and 10, corrects for distortion in the received signal due to effects such as Doppler shifts.

Upper band 216 and lower band 218 are then sent to data demodulator 226 to extract data signal 228, and to subchannel reconstruction 230 to reconstruct any voice data. Reconstructed signal 222 is sent from subchannel reconstruction 230 to voice expansion 232 where any compression introduced by the base station transmitter is reversed. Signal 222 is then passed through pilot tone notch filter 234 which is used to remove the pilot tone from the signal. Switch 236 is used to allow data demodulator 226 to disconnect the voice path when data is present so that the user does not have to listen to data transmission over the radio speaker. The signal is then converted back from a complex signal to a real signal by complex-to-real convertor 238 and then converted to an analog signal by D/A converter 240 allowing the signal to be transformed into an audio signal by the radio speaker (not shown).

Figure 12:
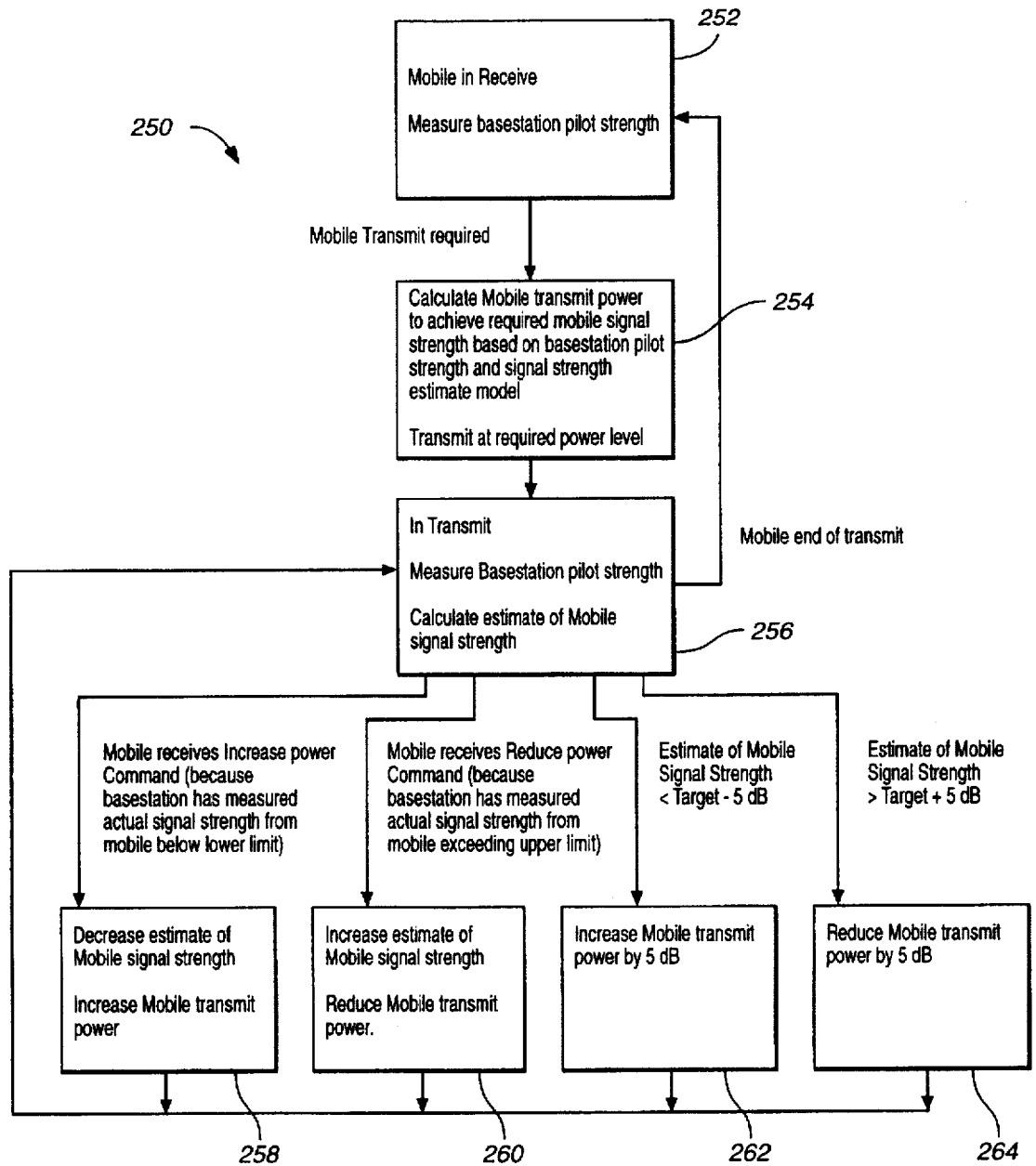
FIG. 12 is a flow diagram for the mobile power control system of the present invention.

Referring now to FIG. 12, a mobile power control system is described. The mobile power control system of FIG. 12 is used to ensure that the mobile transmitter provides a usable signal to the base station receiver and conserve battery power at the mobile unit by ensuring that the transmitter transmits only when required and that the transmitter transmits only the signal strength necessary for a usable signal at the base station receiver without transmitting too strong a signal.

Mobile power control system 250 begins at block 252. Block 252 represents the mobile unit in receive mode and monitoring the base station pilot signal. When the mobile unit is required to transmit, the system passes to block 254. Block 254 represents the mobile unit calculating the transmit power required to achieve the mobile signal strength based on the measured pilot tone, and transmits at the calculated power level. During transmission the system passes to block 256 where the mobile unit calculates an estimate of the mobile signal strength, continues to measure the base station pilot signal and also is responsive to commands from the base station.

If the mobile unit receives a command to increase transmit power from the base station, the system passes to block 258 where the estimate of mobile signal strength is decreased and mobile transmit power is increased, before passing back to block 256. If the mobile unit receives a command to decrease transmit power from the base station, the system passes to block 260 where the estimate of mobile signal strength is increased and mobile transmit power is reduced before passing back to block 256. If the mobile unit while transmitting detects a reduction in pilot tone strength of 5 dB, the system passes to block 262 where mobile power is increased by 5 dB, and the system returns to block 256. Conversely, if the mobile unit detects an increase in the pilot tone strength of 5 dB, the mobile unit reduces power by 5 dB, accordingly, before returning to block 256.

In the preferred embodiment of the present invention, a digital signal processor is used to perform the above described function on the voice or data signals. The digital signal processor is preferably a fixed point 16 bit processor, such as the TMS320C5x series of digital signal processors available from Texas Instruments in Dallas, Tex. Although a digital signal processor is used in the preferred embodiment, it can be clearly seen that the same functions can be obtained using readily available discrete components.

While the invention has been particularly shown and described with reference to a preferred embodiment, it will be understood by those skilled in the art that various changes in form and detail may be made therein without departing from the spirit and scope of the invention.

What is claimed is:

1. A method for creating multiple subchannels in a single two-way radio channel, the method comprising the steps of:
   a) generating at least one pilot tone adjacent to a center of the single two-way radio channel;
   b) splitting the two-way radio channel into a first subchannel for transmitting first voice or data signals on a first upper band and a first lower band;
   c) splitting the two-way radio channel into a second subchannel for transmitting second voice or second data signals on a second upper band and a second lower band, and wherein a combination of the first subchannel and the second subchannel has a bandwidth no larger than the single two-way radio channel;
   d) placing the first upper band in a first upper frequency range above and adjacent to the center of the single two-way radio channel and the first lower band in a first lower frequency range below and adjacent to the center of the single two-way radio channel; and
   e) placing the second upper band in a second upper frequency range above and adjacent to the first upper frequency range and the second lower band in a second lower frequency range below and adjacent to the first lower frequency range.

2. The method of claim 1 wherein two pilot tones are generated, a first pilot tone above and adjacent to the center of the two-way radio channel, and a second pilot tone below and adjacent to the center of the two-way radio channel.

3. The method of claim 1 wherein each of the steps of splitting the two-way radio channel into first and second subchannels includes the step of compressing the voice or data signals on the subchannel.

4. The method of claim 1 further including the steps of:
   f) summing the first and second subchannels to create a broadcast signal; and
   g) transmitting the broadcast signal to a plurality of mobile receivers.

5. The method of claim 1 further including prior to step (a) the step of converting the first and second voice or data signals from analog signals to digital signals.

6. The method of claim 1 wherein steps (a) through (e) are performed by a programmed digital signal processor.

7. The method of claim 1 further comprising the step of:
   f) using the first and second voice or data channels in conjunction to transmit at a faster data rate or a higher voice quality.

8. A method for creating a two-way radio system utilizing a two-way radio signal having a plurality of subchannels in a radio channel, the method comprising:
   a) receiving a plurality of voice or data signals, each of the voice or data signals associated with one of the plurality of subchannels;
   b) splitting each of the plurality of voice or data signals into an upper band and a lower band;

c) moving the upper band to an upper frequency range and the lower band to a lower frequency range, the upper frequency range and the lower frequency range associated with said one of the plurality of subchannels;

d) generating a first pilot tone in a center of the radio channel; and e) combining the upper band and the lower band for each of the plurality of subchannels with the first pilot tone to create the two way radio signal.

9. The method of claim 8 further comprising between steps (a) and (b) the steps of:

converting the plurality of voice or data signals from analog signals to digital signals using an analog to digital converter;

converting the plurality of digital voice or data signals from real signals to complex signals having inphase and quadrature components; and compressing the digital voice or data signals.

10. The method of claim 8 further comprising the step of:

f) transmitting the two way radio signal over the radio channel to a plurality of mobile receivers.

11. The method of claim 10 further comprising the steps of:

g) receiving the two-way radio signal at a mobile receiver;

h) separating a particular subchannel having a particular voice or data signal assigned to the mobile receiver from the plurality of subchannels in the two-way radio signal;

i) correcting for distortions in the particular subchannel using the first pilot tone in the radio signal as a reference; and j) recombining the upper band and the lower band of the particular voice or data signal.

12. The method of claim 10 wherein steps (b) through (e) are performed using a programmed digital signal processor.

13. The method of claim 8 wherein two or more of the subchannels are combined to transmit at a faster data rate or a higher voice quality.

14. A system for creating multiple channels in a single two-way radio channel, the system comprising:

a) a base station transmitter transmitting a signal formed by a pilot tone located near a center of the two-way radio channel, and a plurality of subchannels, each subchannel split into an upper band and a lower band, the upper band in a frequency range above the center of the two-way radio channel, and the lower band in a frequency range below the center of the two-way radio channel;

b) a plurality of mobile receivers, each of the mobile receivers receiving the signal transmitted by the base station transmitter, decoding one of the plurality of subchannels from the signal, the subchannel determined by which of the plurality of mobile receivers decodes the subchannel;

c) a plurality of mobile transmitters, each of the mobile transmitters associated with one of the mobile receivers and transmitting a return signal on the subchannel decoded by the associated mobile receiver, the subchannel split into a return upper band and a return lower band and having a pilot tone associated with and adjacent to either the return upper band or the return lower band; and d) a base station receiver associated with the base station transmitter, and receiving each return signal from the plurality of mobile transmitters, wherein the base station receiver decodes the subchannel in each return signal.

15. The system of claim 14 wherein the base station transmitter includes a plurality of subchannel transmitters each receiving an input for a particular subchannel, a plurality of sub-band relocators connected to and receiving an output of a particular subchannel transmitters, and a summer connected to and receiving outputs from the plurality of sub-band relocators, each of the plurality of subchannel transmitters operable to provide level control and level compression for the particular subchannel, and to split the particular subchannel into the upper band and the lower band, each of the plurality of sub-band relocators operable to place the upper band and the lower band in a frequency range corresponding to the particular subchannel, and the summer operable to combine the outputs the plurality of sub-band relocators into a transmission signal.

16. The system of claim 14 wherein each of the plurality of mobile receivers includes a sub-band separator receiving the signal, a feed forward signal regenerator connected to and receiving the output from the sub-band separator, a subchannel reconstruction connected to and receiving the output from the feed forward signal regenerator, and a voice expansion connected to and receiving the output from the subchannel reconstruction, the sub-band separator operable to separate a particular subchannel from the signal from the base station transmitter, the feed forward signal regenerator operable to compensate for distortions in the particular subchannel, the subchannel reconstruction operable to join the upper band and the lower band of the particular subchannel, and the voice expansion operable to decompress the particular subchannel.

17. The system of claim 14 wherein each of the plurality of mobile transmitters includes a subchannel transmitter receiving an input for a particular subchannel, a frequency shift down connected to and receiving the output from the subchannel transmitter, and a sub-band relocator connected to and receiving an output of the frequency shift down, the subchannel transmitter operable to provide level control and level compression for the particular subchannel, and to split the particular subchannel into the upper band and the lower band, the frequency shift down operable to move either the upper band or the lower band such that the pilot tone can be added adjacent to either the upper band or the lower band, and the sub-band relocator operable to place the upper band and the lower band in a frequency range corresponding to the particular subchannel.

18. The system of claim 14 wherein each of the base station receiver includes a plurality of sub-band separators receiving the signal, a plurality of feed forward signal regenerators connected to and receiving the output from one of the plurality of sub-band separators, a plurality of subchannel reconstructions connected to and receiving the output from one of the plurality feed forward signal regenerators, and a plurality of voice expansions connected to and receiving the output from one of the plurality of subchannel reconstructions, each of the sub-band separators operable to separate a particular subchannel from the return signal from the plurality of mobile transmitters, each of the plurality of feed forward signal regenerators operable to compensate for distortions in the particular subchannel, each of the plurality of subchannel reconstructions operable to join the upper band and the lower band of the particular subchannel, and each of the plurality voice expansions operable to decompress the particular subchannel.

19. The system of claim 14 wherein each subchannel is processed as a digital signal and transmitted as an analog signal.

20. The system of claim 19 wherein the digital signals are processed by a programmed digital signal processor.

21. The system of claim 14 wherein two or more of the plurality of subchannels are combined to enable the system to transmit at a faster data rate or a higher voice quality.

22. The system of claim 14 wherein each of the plurality of mobile transmitters further includes a mobile power control system which monitors the pilot tone transmitted by the base station transmitter and calculates a transmission power for the mobile transmitter to achieve a desired signal strength.

23. The system of claim 22 wherein the mobile power system acts to alter the transmission power based on a change in the pilot tone received from the base station transmitter.

24. The system of claim 22 wherein the mobile power system acts to alter the transmission power in response to a command from the base station transmitter.

25. A base station transmitter for transmitting multiple channels in a single two-way radio channel, the base station transmitter comprising:

a) a plurality of subchannel transmitters each receiving voice or data signals as an input for a particular subchannel and splitting the particular subchannel into an upper band and a lower band;

b) a plurality of sub-band relocators each connected to and receiving an output of one of the plurality of subchannel transmitters, and operable to place the upper band in a frequency range above the center of the two-way radio channel, and the lower band in a frequency range below the center of the two-way radio channel, the frequency range corresponding to the particular subchannel; and c) a summer connected to and receiving outputs from the plurality of sub-band relocators and operable to combine the outputs the plurality of sub-band relocators into a transmission signal.

26. The base station transmitter of claim 25 further comprising a pilot tone generator which generates a pilot tone near the center of the two-way radio channel.

27. The base station transmitter of claim 26 wherein the pilot tone generator generates two adjacent pilot tones near the center of the two-way radio channel.

28. The base station transmitter of claim 25 wherein two or more of the plurality of subchannels received by the plurality of subchannel transmitters are combined to enable the system to transmit at a faster data rate or a higher voice quality.

29. The base station transmitter of claim 25 further comprising a base station receiver, the base station receiver comprising:

i) a plurality of sub-band separators receiving a return signal from a plurality of mobile transmitters each sub-band separator being operable to separate a particular subchannel from the return signal;

ii) a plurality of feed forward signal regenerators each connected to and receiving the output from one of the plurality of sub-band separators and operable to compensate for distortions in the particular subchannel;

iii) a plurality of subchannel reconstructions each connected to and receiving the output from one of the plurality of feed forward signal regenerators and operable to join the upper band and the lower band of the particular subchannel; and iv) a plurality of voice expansions each connected to and receiving the output from one of the plurality of subchannel reconstructions and operable to decompress the particular subchannel thereby reforming an original voice or data signal.

* * * * *